(12) United States Patent
Mizukawa et al.

(10) Patent No.: US 11,993,149 B2
(45) Date of Patent: May 28, 2024

(54) VIBRATION DAMPING DEVICE

(71) Applicants: SUMITOMO RIKO COMPANY LIMITED, Komaki (JP); TOYOTA JIDOSHA KABUSHIKI KAISHA, Toyota (JP)

(72) Inventors: Hiroki Mizukawa, Komaki (JP); Naoki Furumachi, Komaki (JP); Katsuhiro Sakurai, Toyota (JP)

(73) Assignees: SUMITOMO RIKO COMPANY LIMITED, Komaki (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 250 days.

(21) Appl. No.: 17/181,090

(22) Filed: Feb. 22, 2021

(65) Prior Publication Data

US 2021/0268887 A1 Sep. 2, 2021

(30) Foreign Application Priority Data

Mar. 2, 2020 (JP) ................................. 2020-035092

(51) Int. Cl.
*F16F 1/373* (2006.01)
*B60K 5/12* (2006.01)

(52) U.S. Cl.
CPC ............ *B60K 5/1208* (2013.01); *F16F 1/373* (2013.01); *F16F 2230/02* (2013.01); *F16F 2234/04* (2013.01)

(58) Field of Classification Search
CPC .... F16F 1/373; F16F 2230/02; F16F 2234/04; B60K 5/1208
See application file for complete search history.

(56) References Cited

U.S. PATENT DOCUMENTS

| 2,463,059 | A | * | 3/1949 | Saurer | ................... | F16F 3/0873 |
|---|---|---|---|---|---|---|
| | | | | | | 267/140.3 |
| 3,323,786 | A | * | 6/1967 | Boschi | ................... | B60G 11/22 |
| | | | | | | 267/292 |

(Continued)

FOREIGN PATENT DOCUMENTS

| DE | 801868 | C | * | 1/1951 | ............... | F16F 1/373 |
|---|---|---|---|---|---|---|
| FR | 2750189 | A1 | * | 12/1997 | ............... | B60G 7/04 |

(Continued)

OTHER PUBLICATIONS

Mar. 1, 2022 Office Action issued in Japanese Patent Application No. 2020-035092.

*Primary Examiner* — Xuan Lan Nguyen
(74) *Attorney, Agent, or Firm* — Oliff PLC

(57) ABSTRACT

A vibration damping device including: a first attachment member and a second attachment member disposed apart from each other; and a main rubber elastic body connecting the first attachment member and the second attachment member, the main rubber elastic body being of a frustoconical-like shape having an outer peripheral surface whose diameter gradually increases from the first attachment member toward the second attachment member, the main rubber elastic body including a recess opening onto a center portion thereof on a large-diameter side that is a second attachment member side, and the main rubber elastic body that constitutes a bottom part of the recess integrally including a vibration-damping protrusion protruding into the recess.

8 Claims, 2 Drawing Sheets

(56) References Cited

U.S. PATENT DOCUMENTS

| | | | | |
|---|---|---|---|---|
| 4,151,822 A | * | 5/1979 | Miura | F16F 1/387 |
| | | | | 123/195 A |
| 4,896,867 A | * | 1/1990 | Schyboll | F16F 13/107 |
| | | | | 180/902 |
| 6,409,158 B1 | | 6/2002 | Takashima et al. | |
| 8,348,250 B2 | * | 1/2013 | Hofmann | F16F 13/20 |
| | | | | 267/140.13 |
| 9,212,720 B2 | * | 12/2015 | Satori | F16F 13/105 |
| 9,488,246 B2 | * | 11/2016 | Satori | F16F 13/08 |
| 9,958,024 B2 | * | 5/2018 | Kadowaki | F16F 13/105 |
| 2008/0258364 A1 | | 10/2008 | Hirano et al. | |

FOREIGN PATENT DOCUMENTS

| | | | | |
|---|---|---|---|---|
| GB | 736733 A | * | 9/1955 | F16F 1/373 |
| JP | S48-033371 Y | | 10/1973 | |
| JP | S51-135292 U | | 11/1976 | |
| JP | S55-020761 U | | 7/1980 | |
| JP | H03-117137 U | | 12/1991 | |
| JP | H05-061543 U | | 8/1993 | |
| JP | 4780991 B2 | | 9/2011 | |
| KR | 2011053523 A | * | 5/2011 | |

* cited by examiner

[PRACTICAL EMBODIMENT WITH PROTRUSION]

HIGH-FREQUENCY CHARACTERISTICS

[COMPARATIVE EXAMPLE WITHOUT PROTRUSION]

VIBRATION DAMPING DEVICE

INCORPORATED BY REFERENCE

The disclosure of Japanese Patent Application No. 2020-035092 filed on Mar. 2, 2020 including the specification, drawings and abstract is incorporated herein by reference in its entirety.

BACKGROUND OF THE INVENTION

1. Field of the Invention

The present invention relates to a vibration damping device comprising a rubber elastic body and adapted to be applied to, for example, an engine mount and the like.

2. Description of the Related Art

Conventionally, there is known a vibration damping device comprising a rubber elastic body that is adapted to be mounted between components that make up a vibration transmission system. A specific example is the one described in U.S. Pat. No. 6,409,158, which illustrates implementation to, for example, an engine mount of an automobile and the like.

Meanwhile, with such a vibration damping device, sometimes deterioration in vibration damping ability in a specific frequency range can be a problem. Observation of frequency characteristics of the vibration damping ability and the like leads to a presumption that such deterioration in the vibration damping ability is caused by resonance phenomenon of the rubber elastic body or the like. In the case where the frequency range in question becomes a problem with vehicle vibration damping, countermeasures are necessary.

In order to address such problems, for example, Japanese Patent No. JP-B-4780991 proposes providing a mass protrusion in the center portion of a rubber elastic body. The mass protrusion is provided at the part where the amplitude during resonance becomes large in the rubber elastic body where the resonance phenomenon occurs. That is, JP-B-4780991 proposes to minimize the resonance amplitude of the rubber elastic body in the problematic frequency range by providing the mass protrusion protruding outwardly from the approximate center in the free length direction of the rubber elastic body, thereby avoiding deterioration in the vibration damping ability.

However, when the mass protrusion is provided in the center portion of the rubber elastic body where the amplitude and the amount of deformation become large, a significant influence may be exerted on the deformation of the rubber elastic body, and there are concerns about an adverse effect on the inherent spring characteristics and hence on the vibration damping ability, and an adverse effect on durability of the rubber elastic body.

SUMMARY OF THE INVENTION

It is therefore one object of this invention to provide a new vibration damping device which is able to avoid a significant deterioration in vibration damping ability in a specific frequency range with a novel structure.

Hereinafter, preferred embodiments for grasping the present invention will be described. However, each preferred embodiment described below is exemplary and can be appropriately combined with each other. Besides, a plurality of elements described in each preferred embodiment can be recognized and adopted as independently as possible, or can also be appropriately combined with any element described in other preferred embodiments. By so doing, in the present invention, various other preferred embodiments can be realized without being limited to those described below.

A first preferred embodiment provides a vibration damping device comprising: a first attachment member and a second attachment member disposed apart from each other; and a main rubber elastic body connecting the first attachment member and the second attachment member, the main rubber elastic body being of a frustoconical-like shape having an outer peripheral surface whose diameter gradually increases from the first attachment member toward the second attachment member, the main rubber elastic body including a recess opening onto a center portion thereof on a large-diameter side that is a second attachment member side, and the main rubber elastic body that constitutes a bottom part of the recess integrally including a vibration-damping protrusion protruding into the recess.

With the vibration damping device according to the present preferred embodiment, the vibration-damping protrusion is provided in a part of the main rubber elastic body that is away from the direction of connection between the first attachment member and the second attachment member. On the other hand, the bottom part of the recess in the main rubber elastic body where the vibration-damping protrusion is provided is integrally formed with the main rubber elastic body connecting the first attachment member and the second attachment member. Thus, vibration damping action of the vibration-damping protrusion can be exerted on the main rubber elastic body connecting the first attachment member and the second attachment member via the bottom part of the recess. This makes it possible to improve the deterioration in the vibration damping ability in a specific frequency range based on vibration damping action of the vibration-damping protrusion while suppressing the adverse effect on the vibration damping characteristics due to the provision of the vibration-damping protrusion.

A second preferred embodiment provides the vibration damping device according to the first preferred embodiment, wherein the first attachment member has a flat surface in a center portion thereof on the second attachment member side, and the main rubber elastic body that constitutes the bottom part of the recess is overlapped on the flat surface.

With the vibration damping device according to the present preferred embodiment, the bottom part of the recess in the main rubber elastic body where the vibration-damping protrusion is provided is stably supported by the flat surface of the first attachment member, and input vibration from the first attachment member can be stably and efficiently exerted on the vibration-damping protrusion.

A third preferred embodiment provides the vibration damping device according to the first or second preferred embodiment, wherein a circumferential wall surface of the recess has a tapered shape that expands toward an opening side of the recess.

With the vibration damping device according to the present preferred embodiment, it is possible to prevent the vibration-damping protrusion from coming into contact with the inner surface of the recess in the cases where the protruding distal end of the vibration-damping protrusion deforms and displaces to the lateral side, where the main rubber elastic body that constitutes the circumferential wall of the recess deforms so as to swell into the recess, or the like.

A fourth preferred embodiment provides the vibration damping device according to any of the first through third preferred embodiments, wherein the vibration-damping protrusion has a tapered shape that becomes gradually thinner toward a protruding distal end side thereof.

With the vibration damping device according to the present preferred embodiment, in the vibration-damping protrusion, the protruding distal end side, where the amounts of deformation and displacement are likely to be larger than those of the proximal end side, is tapered. With this configuration, the gap between the vibration-damping protrusion and the inner surface of the recess can be enlarged, and contact of the vibration-damping protrusion with the inner surface of the recess is easily avoided, as in the third preferred embodiment. Besides, the tapered shape facilitates mold release during molding of the vibration-damping protrusion. Also, by the protruding distal end side of the vibration-damping protrusion being made tapered to reduce its mass, durability of the vibration-damping protrusion itself can be improved or the like.

A fifth preferred embodiment provides the vibration damping device according to any of the first through fourth preferred embodiments, wherein the vibration-damping protrusion comprises a single vibration-damping protrusion protruding on an elastic principal axis of the main rubber elastic body that extends in a direction of opposition of the first attachment member and the second attachment member.

With the vibration damping device according to the present preferred embodiment, the vibration-damping protrusion is efficiently vibrated in the direction of protrusion with respect to the main input vibration in the elastic principal axis direction of the main rubber elastic body. As a result, vibration damping effect due to the vibration-damping protrusion can be more efficiently achieved with respect to the said main input vibration.

According to the vibration damping device related to the present invention, it is possible to improve the deterioration in the vibration damping ability in a specific frequency range based on vibration damping action of the vibration-damping protrusion while suppressing the adverse effect on the vibration damping characteristics due to the provision of the vibration-damping protrusion.

BRIEF DESCRIPTION OF THE DRAWINGS

The foregoing and/or other objects, features and advantages of the invention will become more apparent from the following description of a practical embodiment with reference to the accompanying drawings in which like reference numerals designate like elements and wherein.

DETAILED DESCRIPTION OF EMBODIMENTS

In order to clarify the present invention more specifically, a practical embodiment of the present invention will be described in detail below in reference to the drawings. In the description hereinbelow, as a general rule, upward and downward refer to upward and downward in FIG. 1.

Figure 1:
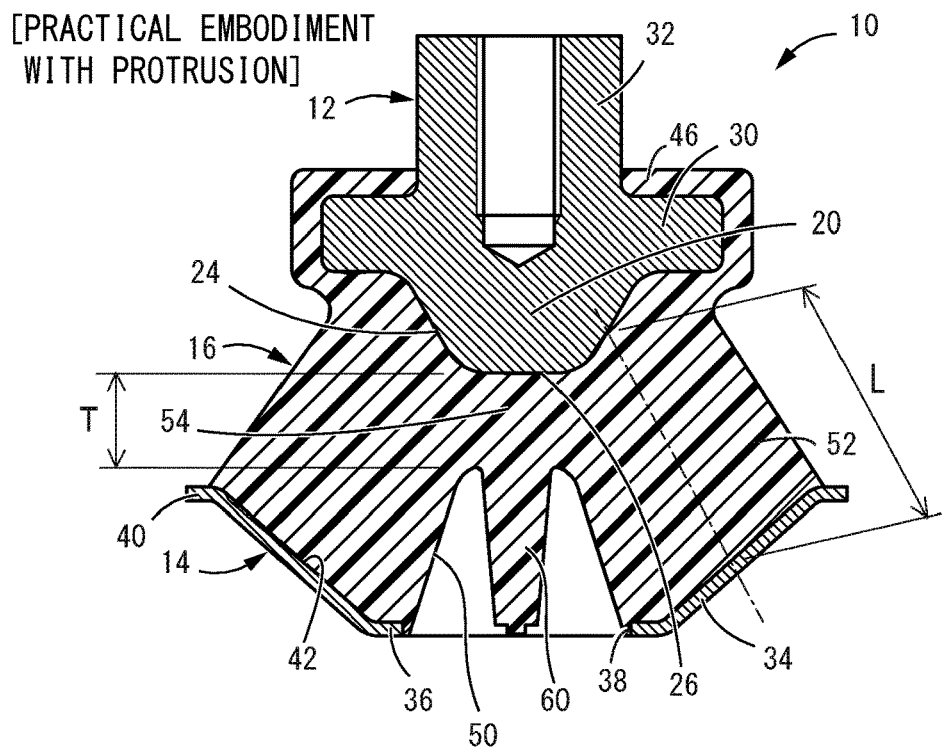
FIG. 1 is a vertical cross sectional view illustrating a vibration damping device according to a first practical embodiment of the present invention.
Figure 2:
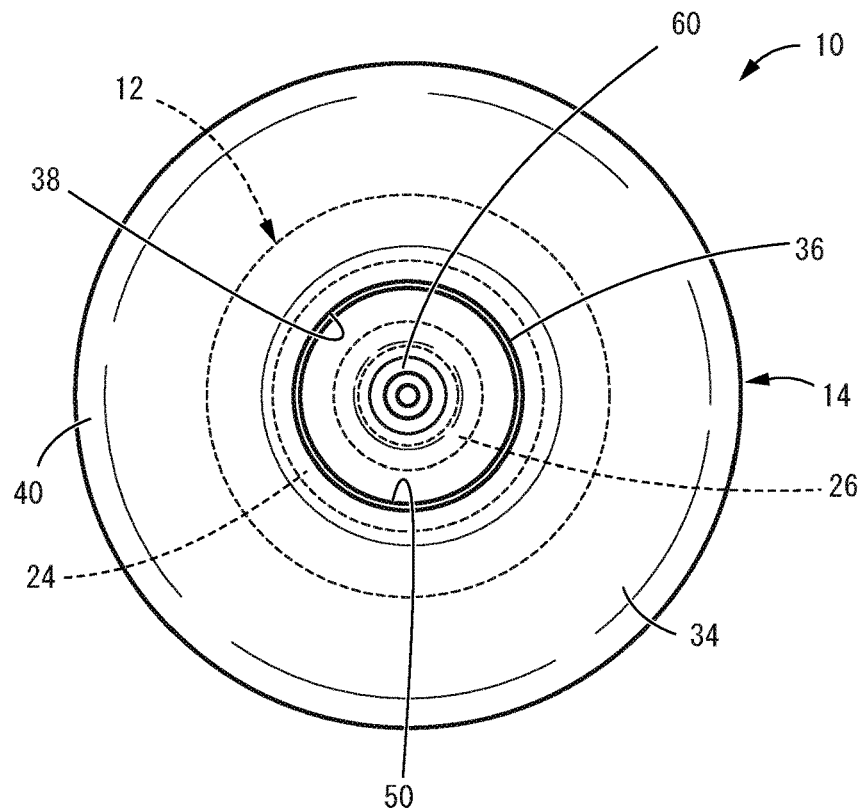
FIG. 2 is a bottom plan view of the vibration damping device shown in FIG. 1.

First, FIG. 1 shows a vibration damping device 10 according to a first practical embodiment of the present invention. This vibration damping device 10 has a structure in which a first attachment member 12 and a second attachment member 14 are elastically connected by a main rubber elastic body 16.

Described more specifically, the first attachment member 12 and the second attachment member 14 are members for fixedly attaching the vibration damping device 10 to one and the other of the components that make up a vibration transmission system, and their specific shape, material, structure, or the like are not limited. Preferably, the first attachment member 12 and the second attachment member 14 are made of a material with high rigidity such as a rigid synthetic resin and metal, and include respective fixing parts for being fixed to one and the other of the components that make up the vibration transmission system.

Typically, a vibration transmission system is made up by a plurality of components that constitute a transmission path of vibration. For example, in the case of an automobile, there are a vibration transmission system from a power unit to a vehicle body, and a vibration transmission system from wheels to a suspension component, from a subframe to the vehicle body, and the like. The vibration damping device 10 is mounted on the vibration transmission path of such a vibration transmission system, so as to constitute, for example, an engine mount for providing the power unit with vibration damping support against the vehicle body, a subframe mount for providing vibration damping linkage of the subframe to the vehicle body, and the like.

The first attachment member 12 of the vibration damping device 10 shown in FIG. 1 has a rotationally symmetrical shape about the center axis and includes a lower projection 20 of an inverted frustoconical shape projecting downward on the center axis. Specifically, the lower projection 20 has a tapered outer peripheral surface 24 that gradually becomes smaller in diameter downward, and the lower end surface of the small-diameter side of the lower projection 20 constitutes a circular flat surface 26 that extends in the axis-perpendicular direction in the center portion of the first attachment member 12.

The upper end of the large-diameter side of the lower projection 20 is provided with a thick, circular-disk shaped flanged part 30 that extends outward in the axis-perpendicular direction. Furthermore, a circular rod-shaped fixing part 32 is provided so as to protrude upward from the center portion of the flanged part 30. The fixing part 32 includes a bolt hole that opens onto the upper end surface thereof and extends downward on the center axis. A fixing bolt is configured to be screwed into the bolt hole, thereby fixedly attaching the first attachment member 12 to one of the components that make up the vibration transmission system, such as the power unit.

Meanwhile, the second attachment member 14 of the vibration damping device 10 shown in FIG. 1 has a circular, generally deep-bowl shape overall, and is provided with a sloped, tapered peripheral wall 34 that increases in diameter upward. A base wall 36 surrounded by the tapered peripheral wall 34 has a large through hole 38 in the center portion thereof, and the base wall 36 is left in an annular shape around the through hole 38. An annular plate part 40 is integrally formed with the opening edge of the upper end of the tapered peripheral wall 34. The annular plate part 40 is narrow, and protrudes radially outward while extending about the entire circumference.

The second attachment member 14 is configured to be fixedly attached to the other of the components that make up the vibration transmission system such as the vehicle body by using, for example, a fixing hole formed by widening the annular plate part 40 to the radially outer side or the like, or a bracket member to be fastened to the second attachment member 14 or the like.

The first attachment member 12 and the second attachment member 14 are disposed apart and opposed to each other in the vertical direction on approximately the same center axis. The flat surface 26 of the lower projection 20 of the first attachment member 12 is arranged so as to be opposed on the center axis to the base wall 36 of the second attachment member 14 in which the through hole 38 is formed. Also, around the center axis, the tapered outer peripheral surface 24 of the lower projection 20 of the first attachment member 12 is disposed in opposition to the inside surface 42 of the tapered peripheral wall 34 of the second attachment member 14 in a direction inclined at a predetermined angle with respect to the center axis. That is, the tapered outer peripheral surface 24 of the lower projection 20 of the first attachment member 12 and the inside surface 42 of the tapered peripheral wall 34 of the second attachment member 14 are inclined in the same direction (although there is some difference in the inclination angle) with respect to the center axis around the center axis.

The main rubber elastic body 16 is arranged between the first attachment member 12 and the second attachment member 14, which are disposed apart and opposed to each other in this way, and the main rubber elastic body 16 connects the first attachment member 12 and the second attachment member 14. In consideration of the initial load exerted on the vibration damping device 10, the magnitude and amplitude of the vibration load, the required load characteristics, and the like, the first attachment member 12 and the second attachment member 14 are fastened to the main rubber elastic body 16 by vulcanization bonding or the like as necessary. However, it is not essential to fasten the first attachment member 12 and the second attachment member 14 to the main rubber elastic body 16, but they may be mated in a non-adhesive way or may be assembled in a positioning state by overlapping or the like.

For example, the vibration damping device 10 of the present practical embodiment can also be obtained as an integrally vulcanization molded component of the main rubber elastic body 16 incorporating the first attachment member 12 and the second attachment member 14 in the following way. Namely, the first attachment member 12 and the second attachment member 14 are accommodated and set in the mold cavity of the main rubber elastic body 16, and the first attachment member 12 and the second attachment member 14 are bonded to the main rubber elastic body 16 simultaneously with vulcanization molding of the main rubber elastic body 16.

The main rubber elastic body 16 has a block shape in the form of a frustoconical-like shape, namely, a substantially frustoconical shape whose diameter gradually increases downward. The upper end of the small-diameter side of the main rubber elastic body 16 is fastened to the lower surface of the first attachment member 12. In the present practical embodiment in particular, the upper end of the main rubber elastic body 16 is fastened not only to the flat surface 26 and the tapered outer peripheral surface 24 of the lower projection 20 of the first attachment member 12, but also up to the lower surface of the flanged part 30.

The main rubber elastic body 16 of the present practical embodiment is provided with a covering rubber 46 that spreads out with a constant thickness so as to cover from the outer peripheral surface of the flanged part 30 of the first attachment member 12 as far as the upper surface thereof. This covering rubber 46 aims to improve the fixing force of the first attachment member 12 to the main rubber elastic body 16. Besides, by the first attachment member 12 coming into contact via the covering rubber 46 in cushioned fashion with a contact part (not shown) that is provided on the vehicle body side by using a bracket or the like, it is also easy to provide a stopper mechanism for limiting the amount of deformation of the main rubber elastic body 16.

The lower end of the large-diameter side of the main rubber elastic body 16 is fastened to the upper surface of the second attachment member 14 opposed to the first attachment member 12. Specifically, the axially lower surface of the main rubber elastic body 16 is fastened to the second attachment member 14 over a range from the upper surface of the base wall 36, to the inside surface 42 of the tapered peripheral wall 34, and further to the radially inner portion of the upper surface of the annular plate part 40.

The main rubber elastic body 16 includes a recess 50 opening downward through the through hole 38 of the second attachment member 14. The recess 50 has a rotationally symmetrical shape around the center axis and is positioned on the center axis of the main rubber elastic body 16. With the recess 50 of the present practical embodiment, the inside diameter dimension is larger at the lower opening than at the upper bottom. In the present practical embodiment in particular, the circumferential wall surface of the recess 50 has a tapered shape that gradually expands toward the lower opening. Besides, in the present practical embodiment, the size of the opening of the recess 50 is approximately the same as or slightly smaller than that of the through hole 38 of the second attachment member 14.

In the formation part of the recess 50, there is no stress transmission in the main rubber elastic body 16, and the direct connection state between the first attachment member 12 and the second attachment member 14 in the direction of opposition does not exist. With this configuration, the direct connection between the first attachment member 12 and the second attachment member 14 in the direction of opposition by the main rubber elastic body 16 around the recess 50 is realized by an inter-face connecting portion 52 extending astride the opposed surfaces of the tapered outer peripheral surface 24 of the lower projection 20 of the first attachment member 12 and the tapered peripheral wall 34 of the second attachment member 14. The inter-face connecting portion 52 has a thick, generally round tubular shape that gradually expands downward.

Additionally, the recess 50 is provided upward from the bottom surface of the main rubber elastic body 16 with a depth dimension that does not reach the lower projection 20 of the first attachment member 12. This configuration provides a rubber bottom part 54 having a thickness dimension T between the upper bottom side of the recess 50 and the lower projection 20 of the first attachment member 12. The rubber bottom part 54 integrally and elastically connects the upper end portion of the above-described thick, tubular shaped inter-face connecting portion 52.

Moreover, on the rubber bottom part 54, a vibration-damping protrusion 60 protruding downward into the recess 50 is integrally formed by the main rubber elastic body 16. The specific shape, size, protrusion height, etc. of the vibration-damping protrusion 60 are not limited, but are set appropriately in consideration of the required vibration damping characteristics, input vibration level, and the like. In the present practical embodiment, employed is a solid, rod-shaped vibration-damping protrusion 60 having a circular, tapered outer peripheral surface that gradually becomes smaller downward with an outside diameter dimension slightly smaller than the upper bottom surface of the rubber bottom part 54.

The outside diameter dimension of the vibration-damping protrusion 60 is smaller than the inside diameter dimension of the recess 50, and around the vibration-damping protrusion 60 in the recess 50, there is provided a gap of a size which can avoid contact of the vibration-damping protrusion 60 with the inner surface of the recess 50 during deformation. Besides, while the vibration-damping protrusion 60 may be provided with a length that extends beyond the recess 50 and protrudes downward from the through hole 38, it is desirable that the vibration-damping protrusion 60 have such a size as to stay within the recess 50 with the object of avoiding interference of the vibration-damping protrusion 60, which juts out from the through hole 38 when mounted onto the vibration transmission system, with other components, or the like.

In the present practical embodiment, the main rubber elastic body 16 has a generally rotationally symmetrical shape around the center axis, and the vibration-damping protrusion 60 has a tapered shape extending on the center axis. Accordingly, the position of the nozzle, which is the injection port for the molding rubber material into the forming cavity during molding of the main rubber elastic body 16, is set at the distal end of the vibration-damping protrusion 60. In preferred practice, one of the molds for molding provided with such a rubber material injection port has molding surfaces for the recess 50 and the vibration-damping protrusion 60, and is configured to be demolded downward on the center axis.

The vibration damping device 10 constructed in the above manner is used, for example, as an engine mount, wherein the first attachment member 12 is attached to the power unit and the second attachment member 14 is attached to the vehicle body. In such an installed state, generally, the static distributed load of the engine mount is exerted in the direction in which the first attachment member 12 and the second attachment member 14 approach each other, and the main vibration to be damped is exerted between the first attachment member 12 and the second attachment member 14 approximately in the center axis direction.

The input vibration is then exerted on the inter-face connecting portion 52 that directly connects the opposed surfaces of the first attachment member 12 and the second attachment member 14 in the main rubber elastic body 16, and compressive/tensile deformation mainly arises in the approximately center axis direction that roughly coincides with the elastic principal axis of the inter-face connecting portion 52. That is, the vibration damping performance of the vibration damping device 10 against the input vibration is mainly exhibited based on spring characteristics and attenuation characteristics of the inter-face connecting portion 52, and the required load bearing performance, enduring performance, and the like are also realized by setting the dimensions, volume, and the like of the inter-face connecting portion 52.

Therefore, the vibration-damping protrusion 60 is provided at a position away from the inter-face connecting portion 52, and the presence or absence and the size of the vibration-damping protrusion 60 are prevented from having a significant adverse effect on the characteristics of the inter-face connecting portion 52, and hence on the basic elastic characteristics, durability, and the like of the vibration damping device 10. Meanwhile, the vibration-damping protrusion 60 protrudes from the rubber bottom part 54 of the main rubber elastic body 16, and the vibration-damping protrusion 60 is continuously connected to the inter-face connecting portion 52 via the rubber bottom part 54.

The inter-face connecting portion 52 is a thick, generally tapered tubular shape that expands downward by the center portion of the frustoconical shape being lightened by the recess 50, and the rubber bottom part 54 is formed so as to cover and connect the upper end part of the inter-face connecting portion 52. Therefore, when vibration is input, stress and deformation are transmitted to the rubber bottom part 54 from the inter-face connecting portion 52, which is subjected to expansive/contractive elastic deformation in the radial direction and extensional/contractive elastic deformation in the axial direction.

As a result, the lower surface of the rubber bottom part 54 (the upper bottom surface of the recess 50) deforms and displaces in the vertical direction in response to the elastic deformation of the inter-face connecting portion 52 caused by the vibration input. This deformation and displacement of the lower surface of the rubber bottom part 54 also exerts vibrating force on the vibration-damping protrusion 60, thereby causing elastic deformation of the vibration-damping protrusion 60. Alternatively, the vertical vibrating displacement of the first attachment member 12 at the time of vibration input exerts vertical vibrating force on the vibration-damping protrusion 60 provided via the rubber bottom part 54 against the lower surface of the first attachment member 12, whereby the vibration-damping protrusion 60 elastically deforms so as to extend and contract in the vertical direction.

The stress and deformation due to the elastic deformation of the vibration-damping protrusion 60 excellently affects the inter-face connecting portion 52 via the rubber bottom part 54, especially in the natural vibration frequency range of the vibration-damping protrusion 60. The vibration-damping protrusion 60 can function as a secondary vibration system for the inter-face connecting portions 52 or the like, or can exhibit vibration damping action or the like in a specific frequency range with respect to the elastic deformation of the inter-face connecting portions 52. Therefore, by utilizing the elastic deformation of the vibration-damping protrusion 60, it is possible to provide a vibration controlling device that suppresses the resonance phenomenon in the specific frequency range induced in the inter-face connecting portion 52.

For example, the vibration controlling device can be provided by tuning the natural frequency of the vibration-damping protrusion 60 to match the frequency range in which the deterioration of vibration damping performance, such as high dynamic spring behavior due to resonance of the inter-face connecting portion 52, is problematic in the vibration damping device 10. The natural frequency of the vibration-damping protrusion 60 can be tuned, for example, by adjusting the material, shape, size (mass), and the like of the vibration-damping protrusion 60.

Figure 3:
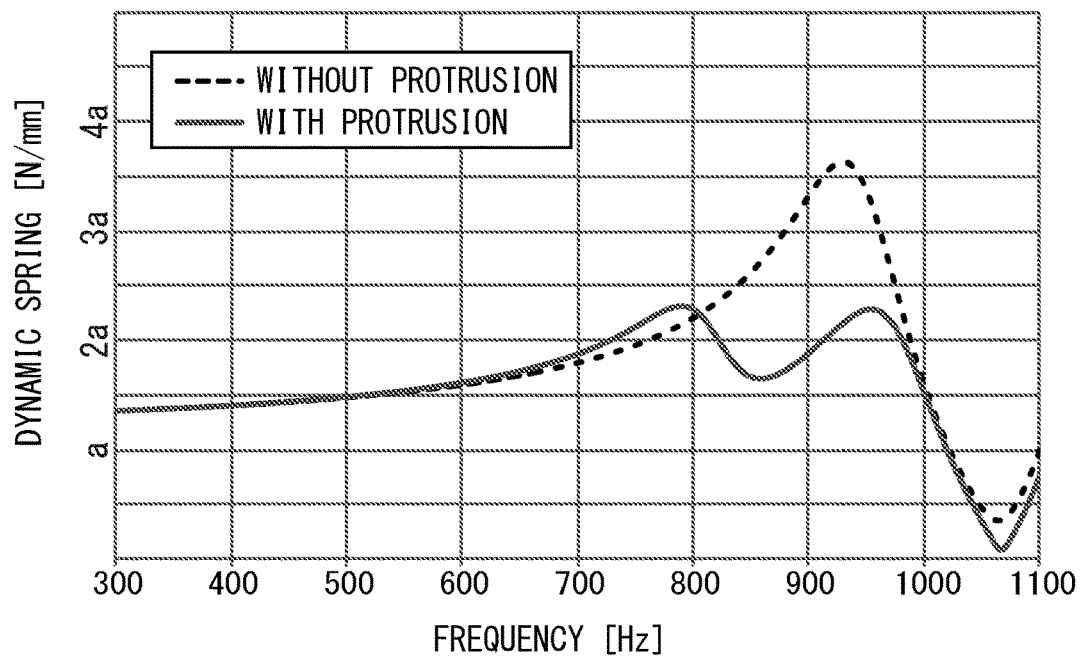
FIG. 3 is a graph showing measurement results of frequency characteristics of the vibration damping device shown in FIG. 1, together with measurement results of frequency characteristics of a vibration damping device as Comparative Example that does not include a vibration-damping protrusion.
Figure 4:
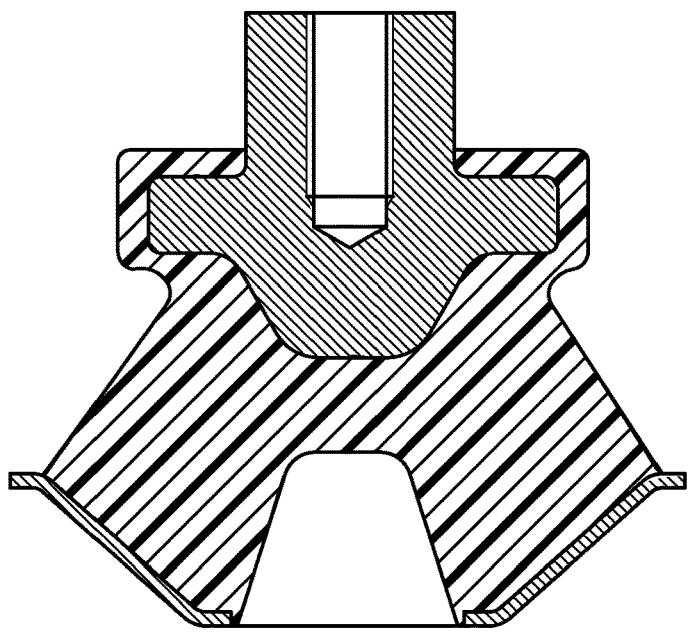
FIG. 4 is a vertical cross sectional view of the vibration damping device whose measurement results of the frequency characteristics are shown as Comparative Example in FIG. 3.

Incidentally, Comparative Example which has the same basic structure as the vibration damping device 10 of the present practical embodiment and does not include the vibration-damping protrusion 60 was prepared, and the results of measuring the frequency characteristics of the dynamic spring for the vibration damping device 10 of the present practical embodiment and Comparative Example under the same conditions are shown together in FIG. 3. Besides, the structure of Comparative Example is shown in FIG. 4.

In the test results shown in FIG. 3, it can be seen that the high dynamic spring behavior shown by the vibration damping device of Comparative Example without the vibration-damping protrusion in the frequency range of around 950 Hz was sufficiently suppressed by the vibration damping device 10 of the present practical embodiment with the vibration-damping protrusion 60.

Regarding the vibration damping mount, which is the main target of the present invention, it has been demonstrated that high dynamic spring behavior, which is generally considered to be caused by the resonance phenomenon of the main rubber elastic body 16, is likely to occur in the range of about 800 to 1000 Hz, and that the vibration damping effect due to the vibration-damping protrusion 60, which is provided at a position away from the input path of main load and vibration in the main rubber elastic body 16 as described above, can be efficiently obtained in the said frequency range.

In order to more effectively obtain the damping effect due to the vibration-damping protrusion 60 against the resonance phenomenon of the inter-face connecting portion 52, it is desirable to set the volume (the mass) of the vibration-damping protrusion 60 within the range of 1 to 5% with respect to the volume (the mass) of the inter-face connecting portion 52. With the volume being smaller than 1%, it may be difficult to sufficiently achieve the damping effect due to the vibration-damping protrusion 60, and with the volume being larger than 5%, increase in size and weight of the vibration damping device etc. is likely to be a problem.

The thickness dimension T of the rubber bottom part 54, which elastically connects the vibration-damping protrusion 60 and the inter-face connecting portion 52, is preferably set within the range of 5 to 20 mm, or within the range of 10 to 30% with respect to the free length L in the center axis direction that connects the cross-sectional centers of the inter-face connecting portion 52. If the thickness dimension T of the rubber bottom part 54 is too small, it may be difficult to exert the deformation and stress of the vibration-damping protrusion 60 on the inter-face connecting portion 52, posing a risk of reducing the vibration damping effect. If the thickness dimension T of the rubber bottom part 54 is too large, increase in size and weight of the vibration damping device etc. is likely to be a problem.

The practical embodiment of the present invention has been described in detail above, but the present invention is not limited to those specific descriptions. For example, it is not necessary that the number of the vibration-damping protrusion be one, but a plurality of the vibration-damping protrusions may protrude from the upper bottom surface of the recess 50. In addition, in the case where a plurality of the vibration-damping protrusions are provided, it would also be possible to set mutually different shapes, masses, etc. to those protrusions to separately tune the frequency or the like.

Besides, regarding the vibration-damping protrusion, in addition to being formed only with rubber elastic body, it would also be acceptable that the vibration-damping protrusion has a composite structure or the like including a metal mass or the like fastened to the protruding distal end side.

The downwardly opening structure of the recess 50 where the vibration-damping protrusion is formed is not limited, and the opening of the recess 50 may be covered with a lid member or the like. For example, when the first attachment member and the second attachment member are displaced in the direction of relative approach during action of a large external load, the vibration-damping protrusion may come into contact with the lid member or the like. By utilizing such contact, it is possible to constitute a stopper mechanism that limits the amount of compressive deformation of the inter-face connecting portion 52 in cushioned fashion by utilizing the vibration-damping protrusion.

The specific shapes of the first attachment member and the second attachment member are not limited. For example, the lower projection 20, the flanged part 30, and the fixing part 32 are not essential to the first attachment member, but the first attachment member may have a simple circular disk shape, a round block shape, or the like.

In the preceding practical embodiment, illustrated is the application of the invention to a solid-type vibration damping device in which the vibration damping performance is exclusively exhibited by a rubber elastic body. However, the invention is also applicable to a conventionally known fluid-filled vibration damping device in which a portion of the wall is constituted by a rubber elastic body, a non-compressible fluid or liquid is sealed inside, and the vibration damping effect based on flow action of the fluid accompanying the vibration input is utilized, and it is also possible to provide a vibration-damping protrusion protruding into the fluid chamber.

In addition, various design changes conventionally known to the public for vibration damping devices are possible. For example, in consideration of the input direction of the load and vibration in the installed state, the first attachment member and the second attachment member may be arranged in opposition so as to be inclined or mutually shifted, the elastic principal axis of the main rubber elastic body may be set inclined, and the shape of the outer peripheral surface of the main rubber elastic body may be made elliptical, and the like.

What is claimed is:

1. A vibration damping device comprising:
a first attachment member and a second attachment member disposed apart from each other; and
a main rubber elastic body connecting the first attachment member and the second attachment member, the main rubber elastic body being of a frustoconical-like shape having an outer peripheral surface whose diameter gradually increases from the first attachment member toward the second attachment member, the main rubber elastic body including a recess opening onto a center portion thereof on a large-diameter side that is a second attachment member side, and the main rubber elastic body that constitutes a bottom part of the recess integrally including a vibration-damping protrusion protruding into the recess, wherein:
the recess includes an inner surface that is spaced apart from the vibration-damping protrusion such that during deformation, a gap is maintained between the inner surface of the recess and the vibration-damping protrusion;
at a time of vibration input, the vibration-damping protrusion does not contact other parts of the main rubber elastic body to prevent limiting an elastic deformation of the vibration-damping protrusion so that the elastic deformation of the vibration-damping protrusion provides a secondary vibration damping action;
the first attachment member includes a tapered outer peripheral surface with a diameter increasing as the first attachment member extends away from the second attachment member, while the second attachment member includes a tapered peripheral wall with a diameter increasing as the second attachment member extends toward the first attachment member, the main rubber elastic body has an inter-face connecting portion extending across opposed surfaces of the tapered outer peripheral surface of the first attachment member and the tapered peripheral wall of the second attachment member, around the recess, and a rubber bottom part defining an upper end of the recess and integrally and elastically connecting an upper end portion of the inter-face connecting portion, the first attachment member and the second attachment member are directly connected by the inter-face connecting portion, while the rubber bottom part is provided with the vibration-damping protrusion projecting therefrom into the recess being spaced away from the inter-face connecting portion, and the vibration-damping protrusion has a length that is at least as long as a length of the recess and stays within the recess.

2. The vibration damping device according to claim 1, wherein the first attachment member has a flat surface in a center portion thereof on the second attachment member side, and the main rubber elastic body that constitutes the bottom part of the recess is overlapped on the flat surface.

3. The vibration damping device according to claim 1, wherein a circumferential wall surface of the recess has a tapered shape that expands toward an opening side of the recess.

4. The vibration damping device according to claim 1, wherein the vibration-damping protrusion has a tapered shape that becomes gradually thinner toward a protruding distal end side thereof.

5. The vibration damping device according to claim 1, wherein the vibration-damping protrusion comprises a single vibration-damping protrusion protruding on an elastic principal axis of the main rubber elastic body, the single vibration-damping protrusion extending in a direction opposite the first attachment member.

6. The vibration damping device according to claim 1, wherein the second attachment member includes a through hole defining an opening of the recess as having a same or a smaller diameter than a diameter of the through hole.

7. The vibration damping device according to claim 1, wherein a volume of the vibration-damping protrusion is set within a range of 1 to 5% with respect to a volume of the inter-face connecting portion.

8. The vibration damping device according to claim 1, wherein a thickness dimension T of the rubber bottom part is set within a range of 10 to 30% with respect to a free length L in a center axis direction that connects cross-sectional centers of the inter-face connecting portion.

\* \* \* \* \*